Nov. 12, 1940.    L. E. PITNER    2,221,434
METHOD OF AND MEANS FOR TREATING PLANTS
Filed Dec. 15, 1937
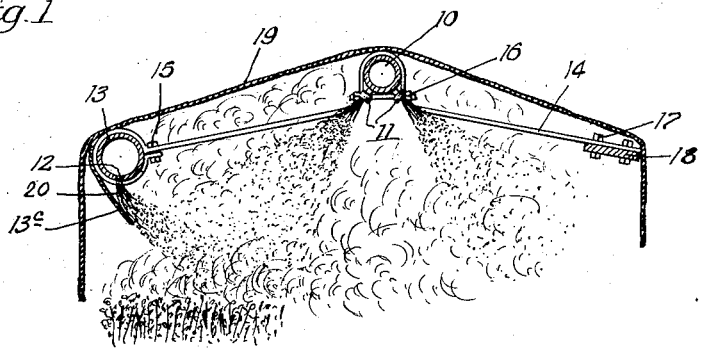
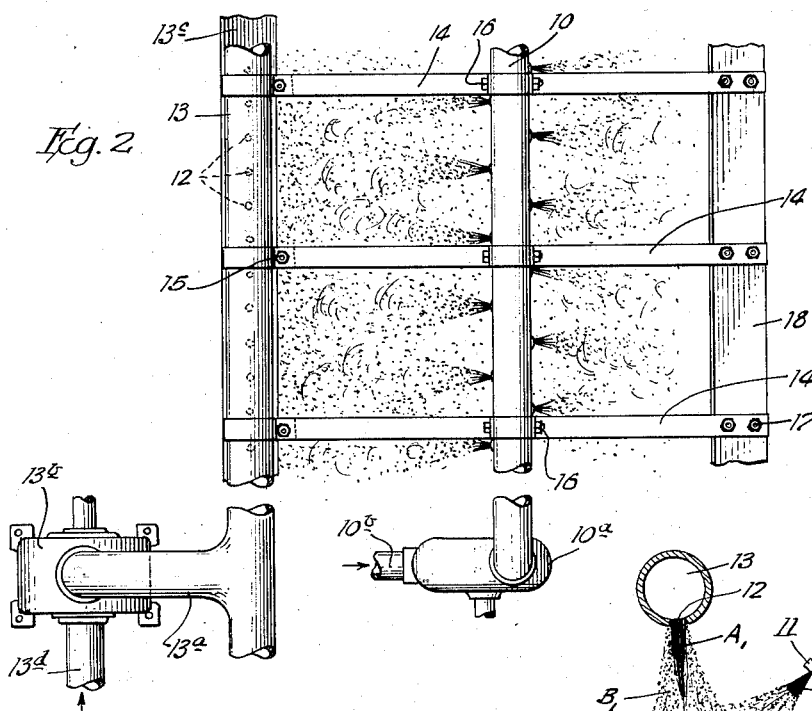
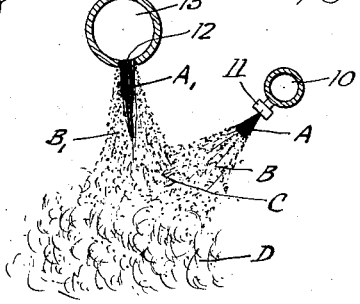
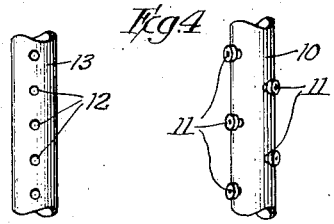
Inventor
Lloyd E. Pitner
John Howard Smith
Atty.

Patented Nov. 12, 1940

2,221,434

UNITED STATES PATENT OFFICE 2,221,434

METHOD OF AND MEANS FOR TREATING PLANTS

Lloyd E. Pitner, Milwaukee, Wis.

Application December 15, 1937, Serial No. 179,851

9 Claims. (Cl. 43—124)

My invention relates to a method of and means for applying dust-like materials to foliage.

In the application of dust-like insecticides, fungicides, fertilizers, and plant foods, it has been found that if the material is moistened it will settle more rapidly on the foliage and will adhere thereto more readily. Furthermore, in the case of many dusts, such as those bearing rotenone, the addition of moisture renders the active ingredients more potent.

However, generally speaking, there are certain limitations upon the amount of moisture which may be imparted to the dust during manufacture, one of these being that fermentation or deterioration due to enzyme action or fungus growth may occur during storage on account of the excess moisture; another being that the dust loses its fluffiness and becomes agglomerated and clumpy, thus losing the property of being sprayable into the atmosphere as an evenly dispersed mass of individual particles.

I have found that a certain amount of moisture can be safely imparted to the dust during manufacture without fermentation and clumping setting in, and for many purposes this moisture is sufficient. However, in other cases it is highly advantageous that moisture, additional to that which will permit storage, be added. The optimum, of course, would be to add this additional moisture during manufacture, but as above stated, this cannot generally be done. I therefore add this latter moisture during the application of the dust to the foliage and it is the main object of my invention to so add the moisture that certain disadvantages, to be explained presently, are obviated.

One of the primary requisites for the efficient disposition of insecticides and the like to foliage is that they be deposited in a uniformly dispersed layer over the surface of the plant. Furthermore, it is highly desirable that the material be deposited in the calyxes which are young and tender and where pests and diseases do the greatest harm to the plant.

I am aware of previous attempts to deposit moisture and dust separately upon foliage, but in such attempts the outstanding belief is that the moisture must first be deposited upon the foliage in order to provide a sticking base for the dust. I have found that by such a procedure two disadvantages occur. First, the contact of the water with the calyxes and blossoms closes the latter, thereby preventing penetration of the later applied dust thereinto. As previously explained, under such conditions the active ingredient, whether plant food, fungicide, or insecticide, does not come to rest on the youngest, tenderest parts of the plant, at which parts the greatest harm occurs from adverse conditions. Second, the moisture, which is usually sprayed in coarse streams, but even if atomized, is deposited on the plant surface and then forms into relatively large droplets before the dust is so deposited. Under these conditions some of the dust is attracted to the droplets and is thus deposited in clumps, the remainder striking the dry portions of the surface and falling to the ground or being blown thereto and as a result being of no benefit to the plant.

I am also aware of previous attempts to add moisture locally to the dust by inserting a moisture nozzle in the dust conduit or adjacent the outlet thereof. With such a construction the result I obtain cannot be had since neither the moisture nor the dust is properly dispersed before mixing and instead of a homogeneous fog of wet dust being formed, a dust spray, intensely moist in parts and dry in other parts, is obtained.

It is an object of my invention to add moisture to the dust during the dusting operation while at the same time obviating the above stated disadvantages.

Another object of my invention is to apply moisture and relatively dry dust to foliage in such a manner that neither the dust nor the moisture are deposited as such, but instead a moisture logged dust (wetted) reaches the plants, or the moisture and dust reach the surface of the foliage simultaneously to form an even homogeneous layer of wet dust particles wherein no clumping has occurred.

Still another object of my invention is to provide a fog of finely divided particles of dust and a fog of highly atomized moisture and to mix them after they are thoroughly dispersed and before either is deposited upon the plants separately.

More specifically it is an object of my invention to disperse a dry dust and a liquid into a given space whereby a fine, floating, homogeneous, wet fog is formed by diffusion of said dust and liquid particles into one another, this diffusion being enhanced by the fact that the liquid and dust outlets are so positioned that the solid, undispersed cones or jets of dust or liquid are spaced from one another to permit dispersion before the particles of one material mix with the particles of the other. Further aspects of the location of these outlets are that they are directed so that material from each floats into the path of the material from the other and that they are spaced far enough apart to permit efficient dispersion prior to diffusion. The last feature is variable in accordance with the speed and pressure at which the materials are emitted from the outlets.

Other objects and advantages will become apparent as the invention is described.

In the drawing:

Fig. 1 represents a cross section of a suitable mechanism by which my method can be practiced;

Fig. 2 represents a top plan view of the mechanism with the cover removed; and

Figs. 3 and 4 represent views of the under side of the dust and spray booms respectively; and Fig. 5 represents a cross section of the cone or jet of material emitted from the outlets.

It is to be understood that the mechanism disclosed herein is for illustrative purposes only and that the method disclosed herein may be practiced with a variety of devices. It will also be understood that the structural features disclosed herein are adapted to be mounted on a vehicle and drawn over the area to be treated.

A suitable spray boom is disclosed at 10 and either water or a solution of a suitable spreading agent such as the compound known commercially as "Santomerse" may be dispensed through atomizing nozzles 11 secured to the lower side of the boom. These nozzles may be arranged in staggered relationship and directed in alternately opposed directions so that moisture, additionally to that directed toward the dust, may be directed rearwardly into the space adjacent the boom for purposes to be described presently. A feed conduit and suitable pressure creating means such as a pump 10a and feed conduit 10b may be connected with the boom 10 to feed and force the liquid through nozzles 11 under sufficient pressure to cause atomization to the extent that a fine fog is created. With such a construction the liquid is dispensed as a relatively free floating fog as distinguished from a solid powerful stream.

An insecticidal dust is blown downwardly through apertures 12 in the bottom of a dust boom shown at 13 and deflected toward the moisture stream by means of a deflector 13c, this dust also being dispensed as a well dispersed fog. Suitable conduits 13a and preferably a low pressure-high velocity blower 13b are associated with the boom 13. By the above construction, the dust, rather than being directed in a stream under high pressure, is expelled into the atmosphere as a fine floating homogeneous fog.

Suitable supporting means is provided to hold the above booms in their proper relative positions and this means, in the present embodiment, includes metallic strips 14, one of the ends of each extending around boom 13 and being bolted as at 15, the approximate centers of which extend around the boom 10 and are bolted as at 16, while the remote ends extend rearwardly and are bolted as at 17 to a support bar 18 which is positioned parallel to the booms.

The structural features of the present embodiment may be completed by a canvas cover 19 adapted to be spread over the structure above described, and having its ends or sides, or both, depending to the foliage, thereby forming a confining chamber into which the liquid and dust fogs are expelled and mixed before settling on the foliage.

As previously stated, various forms of apparatus may be utilized to practice the method of my invention, which method involves substantially the diffusion of a liquid fog and a dust fog one into the other during the dispensing operation and prior to the contact with foliage.

In the drawing it is to be noted that the dust boom 13 constitutes the forward portion of the apparatus shown. As the apparatus progresses over the foliage a cloud of insecticidal, fungicidal or other plant conditioning dust is expelled downwardly as shown at 20 and deflected as above described. Simultaneously, during the operation of the machine, a body of finely dispersed liquid is expelled from the boom 10 through the atomizing nozzles 11. Due to the positions of the nozzles a body of this liquid fog is directed forwardly toward the expelled dust and the liquid and dust first disperse into homogeneous fogs, then meet and are thoroughly diffused into one another before or simultaneously as they reach the surface of the foliage. Other liquid fog from the rearwardly extending nozzles, if the latter are provided, eventually contacts the mixture to increase the liquid content of the final fog mixture. One of the reasons for providing for a set of rearwardly directed nozzles is that the dust in many cases anhydrous and the moisture provided through the forwardly directed set of nozzles is not sufficient to attain the objects set out above.

In Fig. 5 I disclose a diagrammatic cross section of a dust conduit 13a having an outlet 12a and a liquid conduit 10a having a nozzle 11a. The letters represent zones in the emitted material, A and $A_1$ representing respectively the solid, undispersed cone and jet of liquid and dust, while B and $B_1$ represent the dispersed portion respectively of liquid and dust which has formed by the breaking up of A and $A_1$ into minute particles of liquid and dust in the air. C represents that zone or space wherein the above dispersed portions, which are now free floating fogs, are coming into contact and are diffusing into one another, while D represents that zone in which the thoroughly diffused dust and liquid has formed a liquid laden, floating fog ready to settle on foliage. It is to be noted, with respect to the relative location of the dust and liquid outlets, that these outlets should not be placed so close to one another that the zones A and $A_1$, or parts thereof, occupy the same space. Should this condition occur, the liquid and dust will mix before dispersion and will contact each other at the relatively high speed of emission instead of floating and evenly diffusing with one another. Under these circumstances there is no homogeneity in the resulting mixture and furthermore said mixture will not constitute a fog of highly dispersed particles, but will contain relatively large, undispersed clumps of dust and globules of liquid. It will be readily recognized that the relative location of the outlets is also limited to the extent that the outlets must be located close enough to one another and directed so that the dispersed zones B and $B_1$ travel to the same space to permit diffusion of one into the other to form the mixed fog D.

I find by so creating these fogs of fine particles and mixing them as fogs, as distinguished from streams of coarse particles, that after they combine, the resulting thoroughly wetted dust still retains its ability to float like dry dust, thus maximum coverage of the plant life is ensured due to the fact that even after wetting, the dust retains its fineness and will float into the calyxes, to the under surfaces of the leaves and to the lower portions of the plants. Thus it will be seen that I have provided a method of application wherein the liquid component does not reach the plants before the insecticidal agent but rather as the liquid or the dust reaches the surface of the foliage it carries the other with it, and they are deposited together as a homogeneous layer of wet material which entirely envelops the plant. Furthermore, I have provided a method of application which involves the mixing of fine fogs as distinguished from high pressure streams of either the dust or the liquid.

I have heretofore referred to the dust as the insecticidal or otherwise active agent. However, I have found that such an agent may be incorporated in the liquid in solution form or that such an agent may be in both the dust and the liquid. If the agent is in the solution only then the dust comprises any suitable, preferably absorptive, diluent or carrier.

It will be readily understood that the canvas 19 serves both as an aid to the formation of a homogeneous, wetted fog by providing a chamber in which the fine particles of dust and liquid may float to contact one another, and as a preventative against escape of the mixed materials into the air with resulting waste.

I believe that basically, the efficiency of the method and mixture disclosed herein is somewhat reliant upon the fact that after expulsion from the respective nozzles and apertures 11 and 12 the fine dust and liquid fog particles encounter a marked reduction in velocity of travel, and thus float in the air, during which interval they have ample opportunity by virtue of their relatively slow, floating movement to become thoroughly and efficiently diffused to form the desired homogeneous mass of wetted dust. Furthermore, due to the anhydrous character of the dust, the dust particles and liquid particles have great affinity for one another with the result that efficient diffusion is obtained.

Having thus described my invention what I claim as new and desire to secure by United States Letters Patent is:

1. A method of treating foliage which consists of the steps of forming a finely dispersed body of liquid and a finely dispersed body of a dust-like insecticidal agent, and diffusing the bodies one into the other before either comes to rest separately upon the surface of the foliage being treated.

2. A method of treating foliage which includes the steps of blowing a plant conditioning dust into the atmosphere at high velocity and low pressure as a homogeneously dispersed fog, atomizing a liquid into the atmosphere toward said first named fog as a homogeneously dispersed fog and diffusing said fogs one into the other to form a homogeneous fog mixture.

3. A method of applying a plant conditioning material, in which a powder is mixed with a liquid, which includes the steps of expelling a powder into a confining chamber as a free floating, highly dispersed body, and expelling the liquid into said chamber under pressure as a free floating, highly dispersed body, said bodies being diffused one into the other before leaving said chamber.

4. A method of applying a plant conditioning material in which a powder is mixed with a liquid which includes the steps of forming a highly dispersed fog of powder in a given space and expelling and diffusing a highly dispersed fog of liquid into said space before said fog of powder is dissipated therefrom.

5. A method of treating plant life which includes expelling separate highly dispersed fogs of an active powder and a liquid and mixing said fogs after the expulsion and after a reduction in the velocity of travel of the separate fog particles has occurred but before the unmixed particles have come to rest on the foliage to be treated.

6. An apparatus for applying plant conditioning material which comprises an outlet for a powdered material, an atomizing outlet for liquid material, and a confining chamber, said outlets being positioned within said chamber being located in spaced relationship, and being directed toward one another so that the powdered material and the liquid will mix while suspended in air and before settling.

7. In a device for dispensing plant conditioning material, in combination, a powder dispensing boom and a liquid atomizing dispensing boom located in spaced relationship to said powder dispensing boom, outlets in said booms for said powder and said liquid respectively, said outlets being positioned to direct the powder and the atomized liquid into contact with one another in the vicinity of said booms.

8. A method of treating plant life which includes expelling separate highly dispersed fogs of an active powder and a liquid and mixing said fogs after the expulsion and after a reduction in the velocity of travel of the separate fog particles has occurred.

9. In a dusting system, a dust outlet and a liquid atomizing outlet from which dust and liquid respectively are emitted as solid streams which subsequently disperse into bodies of free floating particles, said outlets being so spaced that the solid streams do not merge and so the bodies of free floating dispersed particles of dust and liquid diffuse one into the other, while in suspension in the air.

LLOYD E. PITNER.